March 28, 1961 S. MATUSZEWSKI ET AL 2,976,614

MEASURING TAPE REEL HOLDER

Filed Sept. 28, 1959

INVENTORS.
SYLVESTER MATUSZEWSKI,
ELIZABETH MATUSZEWSKI.
BY Archworth Martin
their ATTORNEY.

2,976,614

MEASURING TAPE REEL HOLDER

Sylvester Matuszewski and Elizabeth Matuszewski, both of R.D. 3, Slippery Rock, Pa.

Filed Sept. 28, 1959, Ser. No. 842,626

3 Claims. (Cl. 33—27)

Our invention relates to holders for measuring tapes and is particularly suitable for use with standard forms of metal tapes of the spring-reel type.

One object of our invention is to provide a holder and guide of such form that standard types of tape reels can be applied thereto and which will facilitate the laying out of various patterns on plain surfaces, such as arcs, circles and rectangles.

Another object of our invention is to provide a holder and guide of the character referred to that can readily be employed for scribing or marking on paper, wood, glass and metal, etc.

Figures 1, 2:
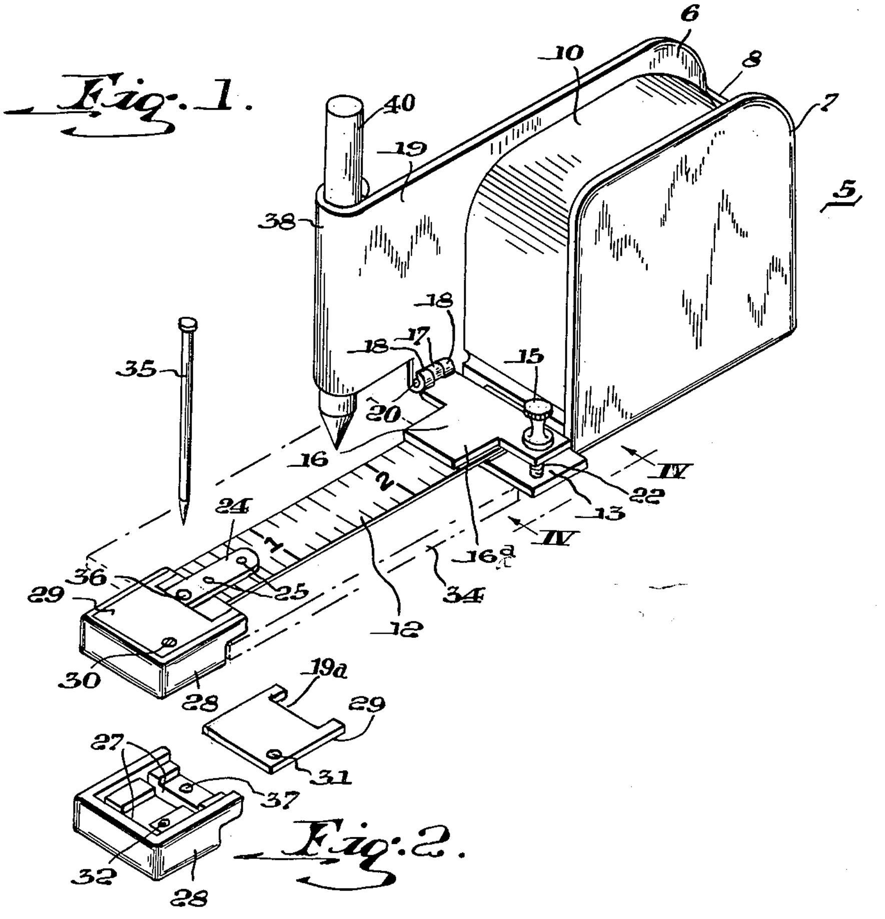
Figure 1 is a perspective view of a measuring tape reel and our holder and guide, in assembled relation.
Fig. 2 is a view showing the two parts of a guide and clamping plate for the free end of the tape.
Figure 3:
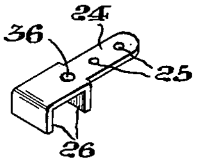
Fig. 3 is a view showing the anchoring plate for the free end of the tape, that is releasably connected to the said guide.
Figure 4:
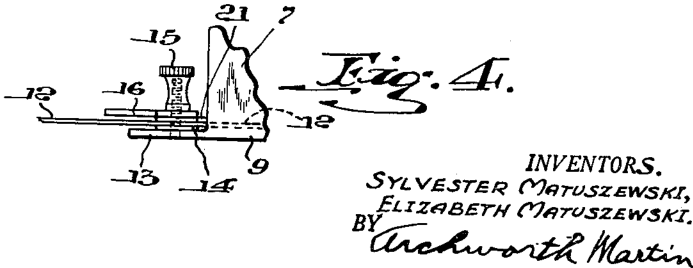
Fig. 4 is a view taken on the line IV—IV of Fig. 1.

The apparatus comprises a casing 5 that has side walls 6 and 7 and a rear end wall 8 and a bottom wall 9, which may conveniently be made as a simple stamping of sheet metal or plastic. The rear wall 8 may be integral with one of the side walls and welded or soldered to the vertical edge of the other side wall, to complete a partial box-like enclosure that is open at its top and front side, to receive a housing 10 for a tape reel of one of a number of conventional forms. The bottom wall 9 may be formed of a separate piece welded to the lower edges of the side walls 6 and 7 or may be formed integrally with one of the side walls and welded or soldered to the lower edge of the other side wall. The housing 10 for the reel in this instance is of somewhat angular form, as distinguished from the reel housings of circular form. However, either the non-circular type shown at 10 or a circular type of tape housing may be used with our holder.

The tape 12 will usually be of spring steel and the reel therefor placed under rewinding tension when the tape is withdrawn to expose the measuring scale thereon, as is common in measuring tapes of this type. The tape as it is drawn from the reel in the housing 10 will slide over a ledge or guide plate 13 that projects forwardly from the bottom wall 9 of the casing. A padding strip 14 is glued to the guide plate 13 to serve as a cushioned support for the tape when the tape is clamped to hold it in a desired projected position by a thumb nut 15. The thumb nut engages the upper face of a clamping plate 16 that has a hinge knuckle 17 formed thereon and disposed between hinge knuckles 18 that are formed on a forward extension 19 of the side wall 6, the usual pintle or hinge pin 20 extending through the knuckles to complete the hinged joint. The plate 16 has a felt strip 21 glued to the underside thereof and also has a hole to receive a threaded stud 22 that is rigidly carried by the ledge or guide plate 13. Therefore, when the nut 15 is tightened down the tape will be securely held at any desired distance of projection from the casing. When the nut is entirely removed and the plate 16 swung to an upright position, the tape reel housing can be removed from the casing 5.

At its free end, the tape 12 has an anchoring hook 24 riveted thereto at 25. The rearwardly extending member 24 has two depending flanges 26 that are insertable into vertical slots 27 in a stop member or block 28 when a cover plate 29 is removed from the block 28 as shown in Fig. 2. When the extension member 24 of the block is seated in the block 28, the cover plate 29 will be applied and held on the block by a screw at 30 that extends through a hole 31 in the plate and into a tapped hole 32 in the block.

When it is desired to draw straight lines on the surface of a slab 34 or the like the necessary amount of tape 12 will be drawn from the reel and the undercut edge of the block 28 placed against the edge of the surface to be lined. Obviously lines of any desired length can be drawn and in different directions, depending upon which edge of the work-piece 34 is engaged by the stop member 28. Thus, a line can be drawn entirely across the surface, or a series of lines drawn to form rectangles thereon.

The ledge 13 is shown in Figure 1 as abutting against one edge of the work-piece 34. For very wide work-pieces, where relatively short lines are desired, the ledge 13 can be supported upon the top surface of the work-piece and the tape 12 used as a straight-edge, if it is of steel or other stiff material.

When it is desired to draw arcs or circles on a plain surface, the block 28 will be placed on such surface at the point where an anchoring pin or nail 35 inserted through a hole 36 in the member 24 and a hole 37 in the block 28 and thence into the board 34, will be at the center or axis of the desired figure to be drawn.

The plate 29 is recessed at 38 to receive the lip 16*a* of the plate 16, so as to allow withdrawal of the outer end of the tape into proximity to the casing for the reel housing 10, so that the outer edge of 16*a* can serve as a reading mark. Also, the extension 24 can be clamped by the plate 16 and the block 28 thereby snugly held against the casing when the holder is not in use.

The radius of curvature of course will depend upon the distance between the pin 35 and the casing 5. A scribing tool 40 such as a lead pencil, a diamond tipped stylus or other scoring implement will be inserted through a vertical cylindrical holder 19*a* formed on the extension 19 of the side wall 6. The character of scribing tool will depend upon the material being operated upon. For wooden boards and some plastics, a pencil will serve, while on glass or metal some harder scribing implements will be required. Complete circles or parts of circles can be drawn in this manner by swinging the casing and the tape about the pin 35 as a center.

We claim as our invention:

1. A holder for a measuring tape of the spring reel type, that comprises a reel upon which a tape is wound and a housing therefor, a U-shaped casing enclosing at least two sides of said housing, said housing having an opening at its front side through which the tape may be withdrawn from the reel, a forwardly-extending guide plate carried by the casing at a plane below the opening, a clamping plate hinged at one end to the casing, on a horizontal axis and normally in overlying relation to the tape and the guide plate, a releasable connection between the other end of the clamping plate and the guide plate, for gripping the tape between the clamping plate and the guide plate, a forwardly-extending relatively narrow lip on the clamping plate, a block secured to the forward end of the tape, the block having a shallow recess in its uppersurface in position to receive the said lip when the tape is fully retracted toward the housing, an extension on the block in position to be gripped between the clamping plate and the guide plate, when the tape is retracted, a scribing tool holder on the casing, and a pointed anchoring member on the block.

2. A holder as recited in claim 1, wherein the block has a shoulder at its lower rear corner, below the said extension, in position to engage the forward edge of a surface upon which the extension and the forward end of the tape are placed.

3. A holder as recited in claim 2, wherein the holder for the scribing tool is alongside the path of the tape, at a predetermined distance forwardly of the clamping plate, and the said shoulder and anchoring member are at the forward extremity of the tape.

References Cited in the file of this patent

UNITED STATES PATENTS

| | | |
|---|---|---|
| 2,065,143 | Metcalf | Dec. 22, 1936 |
| 2,539,611 | Daniel et al. | Jan. 30, 1951 |
| 2,581,858 | Hilt et al. | Jan. 8, 1952 |
| 2,582,488 | Kroenlein | Jan. 15, 1952 |
| 2,651,843 | Goodford | Sept. 15, 1953 |
| 2,807,886 | Aciego | Oct. 1, 1957 |
| 2,893,122 | Greco | July 7, 1959 |